July 5, 1938.  E. H. KOCHER  2,122,427
LUBRICATION
Filed Feb. 24, 1931  7 Sheets-Sheet 1
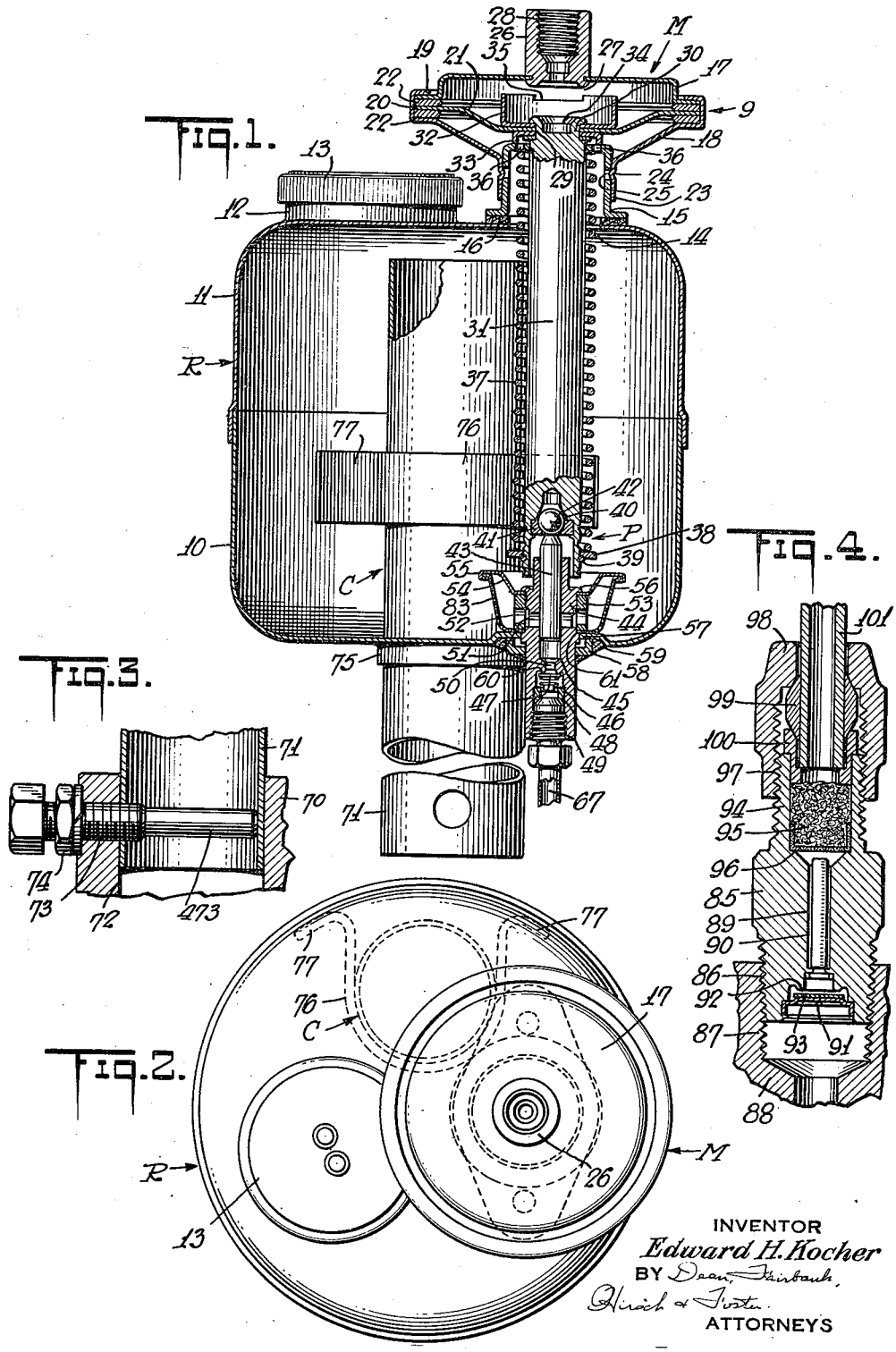
INVENTOR
Edward H. Kocher
BY
ATTORNEYS July 5, 1938.  E. H. KOCHER  2,122,427
LUBRICATION
Filed Feb. 24, 1931  7 Sheets-Sheet 2
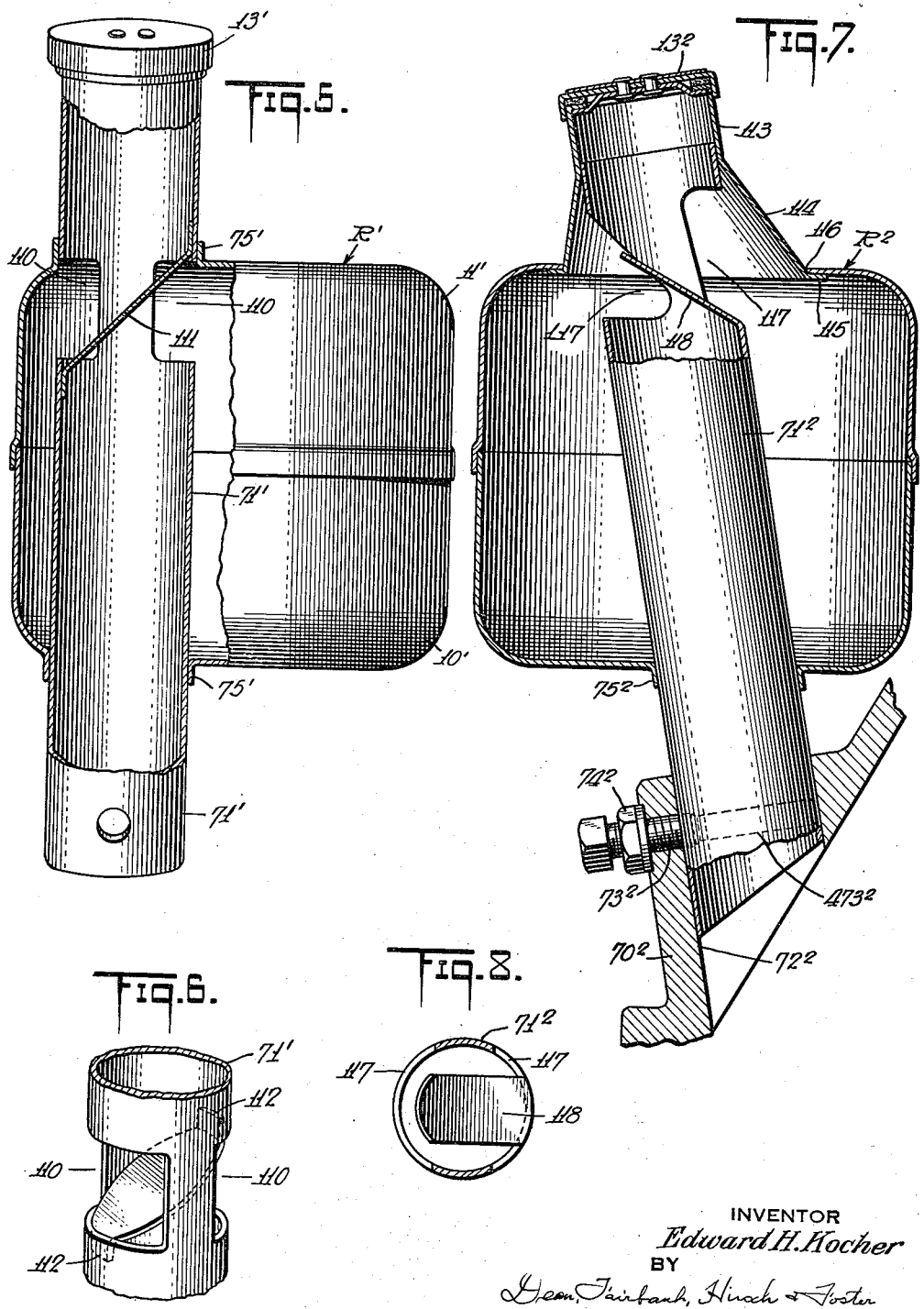
INVENTOR
Edward H. Kocher
BY
ATTORNEYS

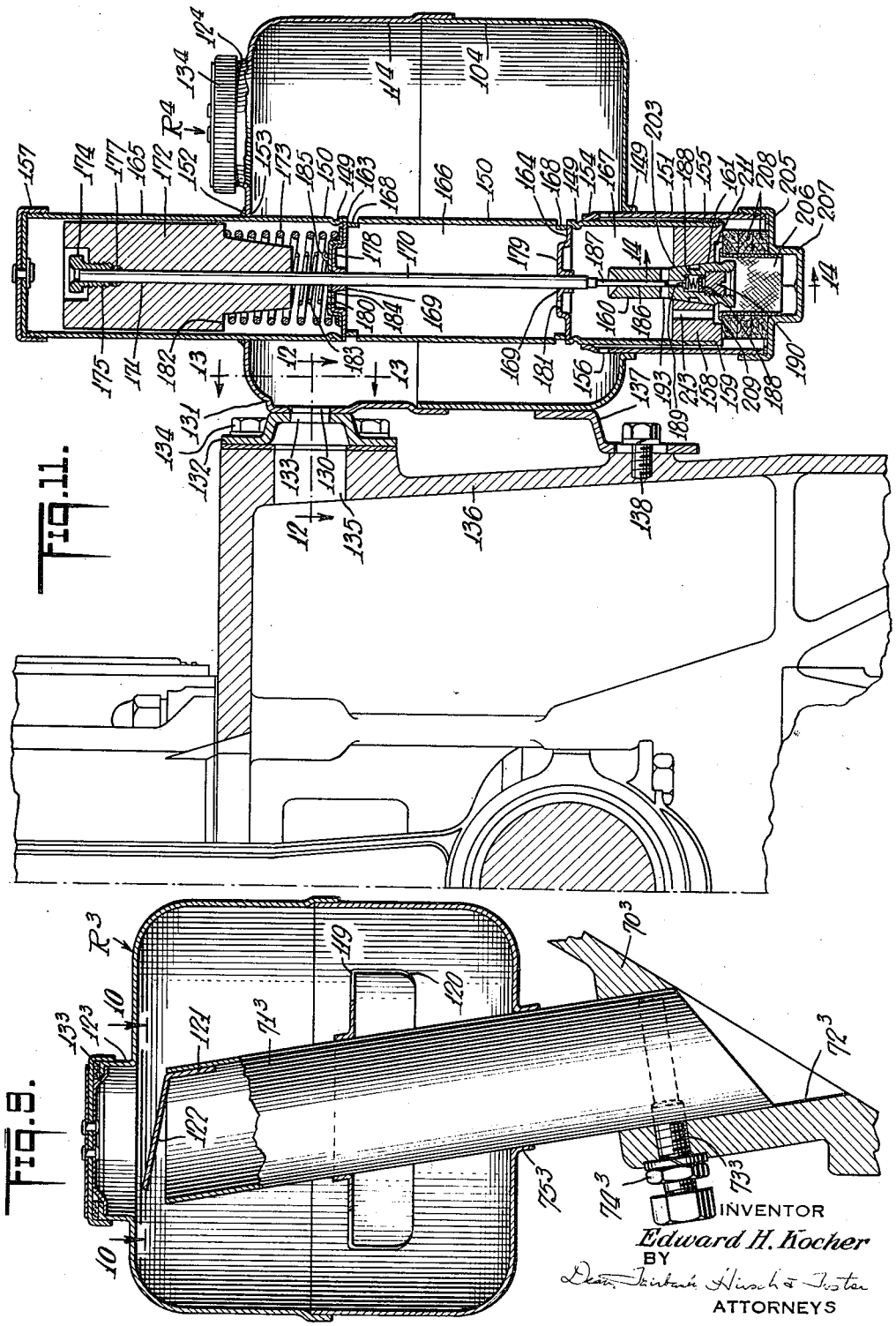

July 5, 1938.　　　　E. H. KOCHER　　　　2,122,427
LUBRICATION
Filed Feb. 24, 1931　　　　7 Sheets-Sheet 4
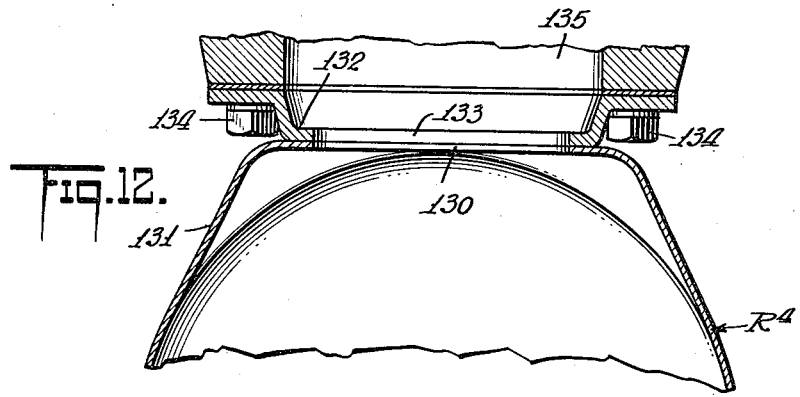
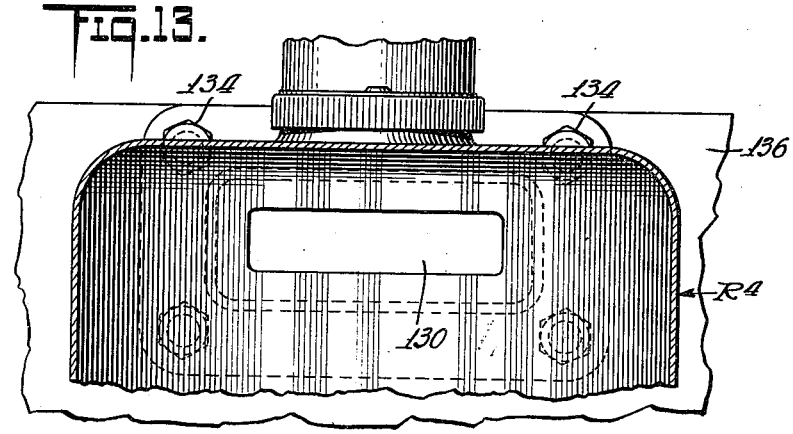
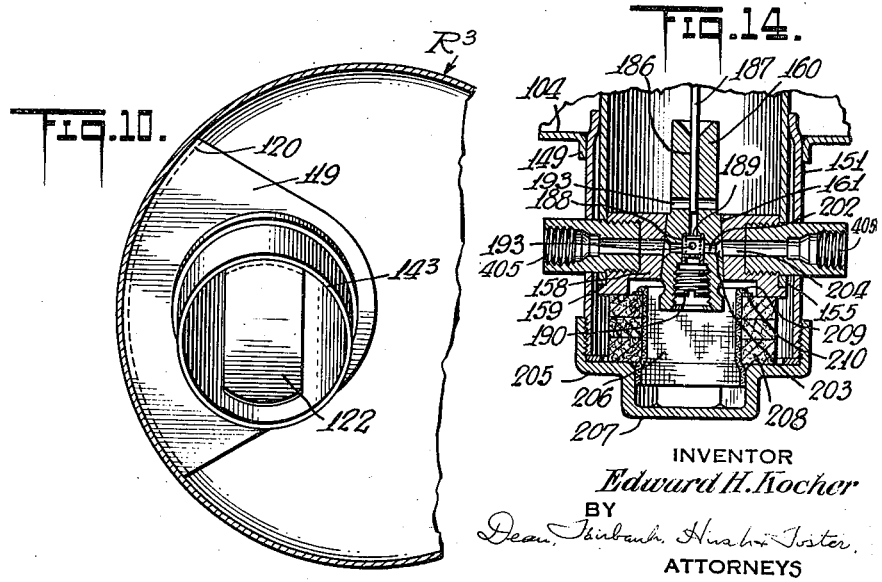
INVENTOR
Edward H. Kocher
BY
ATTORNEYS July 5, 1938.  E. H. KOCHER  2,122,427
LUBRICATION
Filed Feb. 24, 1931  7 Sheets-Sheet 5
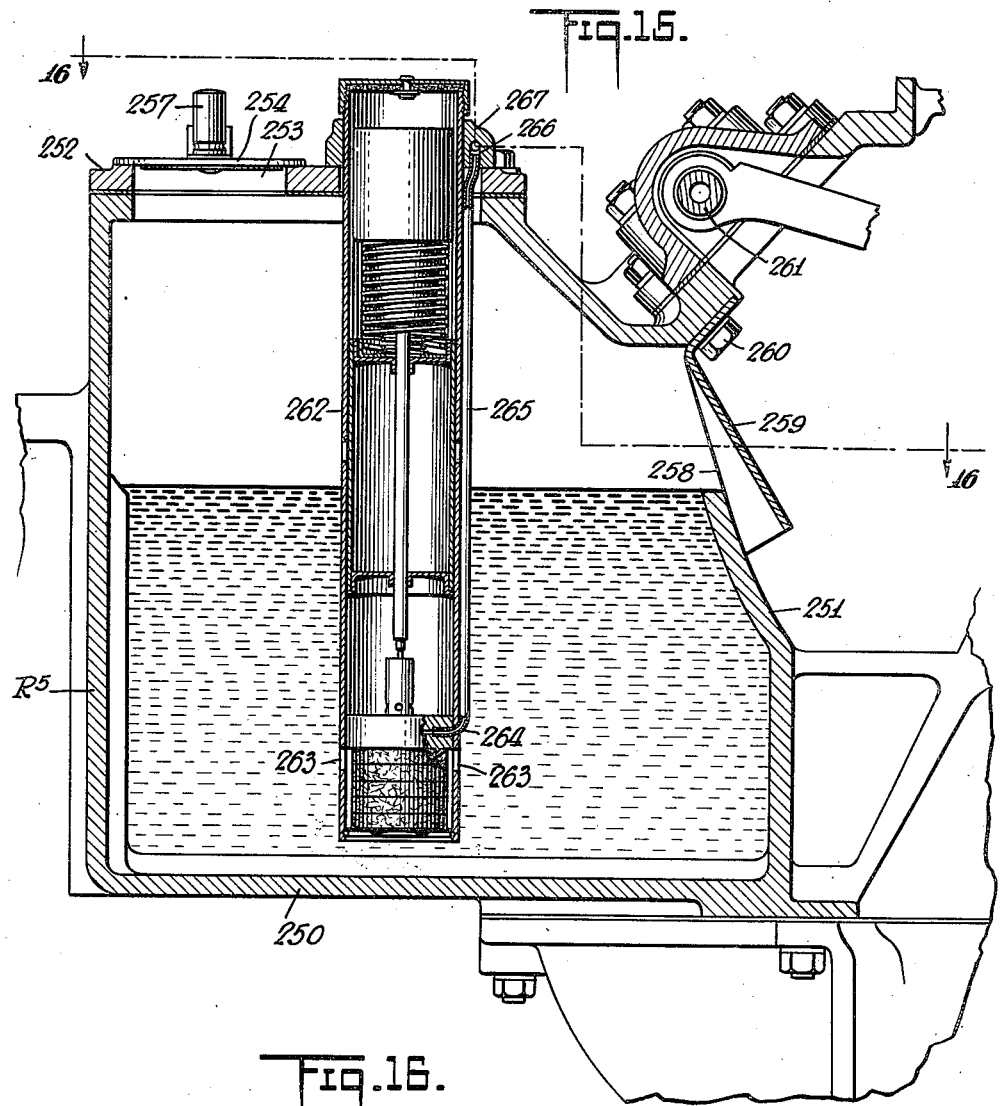
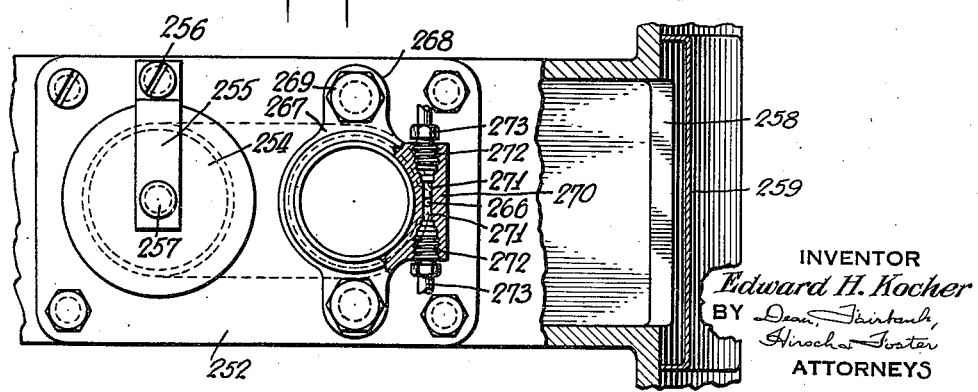
INVENTOR
Edward H. Kocher
BY
ATTORNEYS July 5, 1938. E. H. KOCHER 2,122,427
LUBRICATION
Filed Feb. 24, 1931 7 Sheets-Sheet 6

INVENTOR
*Edward H. Kocher*
BY
*Dean, Fairbank, Hirsch & Foster.*
ATTORNEYS

July 5, 1938.  E. H. KOCHER  2,122,427
LUBRICATION
Filed Feb. 24, 1931  7 Sheets-Sheet 7
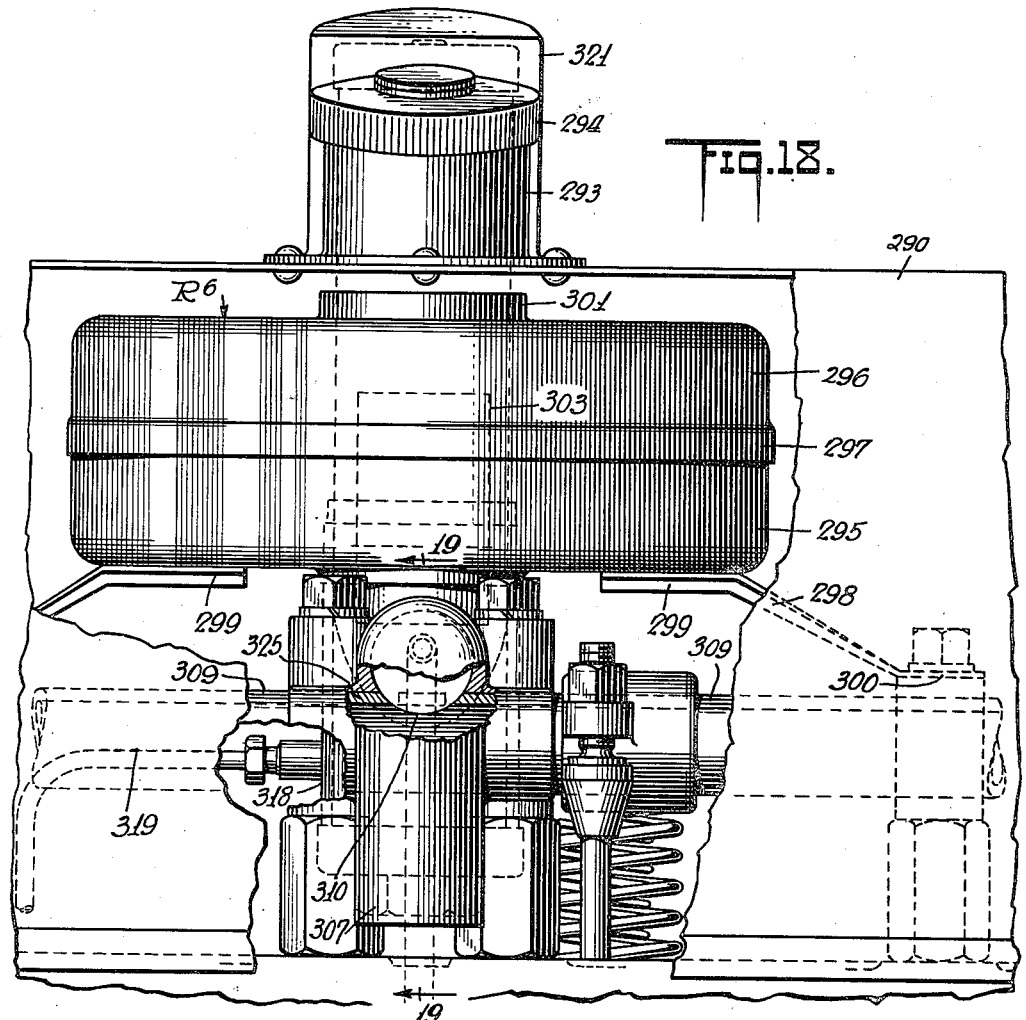
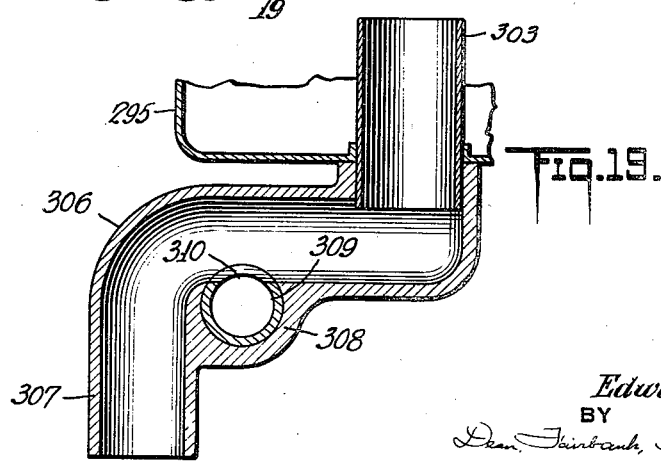
INVENTOR
Edward H. Kocher
BY
ATTORNEYS Patented July 5, 1938

2,122,427

UNITED STATES PATENT OFFICE 2,122,427

LUBRICATION

Edward H. Kocher, Boonton, N. J., assignor to Auto Research Corporation, a corporation of Delaware Application February 24, 1931, Serial No. 517,687

8 Claims. (Cl. 184—6)

The present invention relates to lubrication and particularly to the lubrication of the chassis bearings of an automotive or other vehicle.

An object of the invention is to provide a lubricating installation of the character described which will function to lubricate a plurality of bearings with a minimum of attention, and which although it utilizes an individual lubricant supply, will not require individual attention even for filling, but will receive its supply incidental to the supply of lubricant to some other part of the mechanism or vehicle.

Another object is to provide an arrangement by which the crank case of an automotive engine will receive its lubricant supply by a filling operation, which operation additionally serves to charge a reservoir or reservoirs associated with lubricating systems, particularly of the waste or non-circulating type, as are utilized to supply the chassis bearings, and to accomplish this result without diminishing the crank case supply or overcharging said reservoir or reservoirs.

Another object is to combine the lubricant supply arrangements for the engine and chassis lubricating systems of an automotive vehicle in such a manner that a replenishing of the lubricant supply for the engine lubricating system will inherently and automatically result in a replenishment of the supply for the chassis system, without at the same time interfering with the subsequent independent operation of said systems.

Another object is to provide a combined pumping and reservoir unit for a central chassis lubricating system may be readily supported on or about the engine of the vehicle and which is charged with lubricant as a necessary incident to supplying the crank case of the engine with lubricant.

Another object is to provide a self-contained unit to serve as a source of lubricant and of pressure for a distribution system leading to the bearings of an automobile chassis, and which admits of installation on or about the engine structure in such relation to the crank case as to facilitate the charging of both said source and the crank case by a single filling operation.

Other objects are in part obvious and in part pointed out hereinafter.

A feature of the present invention consists in combining with a chassis lubricating installation, which may desirably be of the character disclosed in Bijur Patents Nos. 1,632,771, 1,732,212 and 1,746,139, a unitary reservoir and pumping arrangement, which arrangement may be manually controlled but is preferably actuated automatically during operation of the vehicle as by a motor of the inertia or fluid pressure type. The reservoir is associated with or is an integral part of the engine housing and in its preferred form serves to admit lubricant to the crank case of the engine structure and constitutes preferably the sole filling means for the engine oil pan. The reservoir may be so constructed that it will trap an amount of lubricant which will suffice for the chassis lubricating requirements between crank case fillings and will permit the excess lubricant over such amount to pass on to the crank case. The reservoir may be formed in some hollow part of the engine structure, such as the support arms, or a separate metal reservoir may be attached to the engine adjacent the crank case, or if desired, at higher level, as above the valve mechanism.

Communication from the chassis reservoir to the engine oil pan may occur through an overflow tube extending from adjacent the top of the reservoir through the bottom thereof and into the crank case. The top of the tube is either offset from the filler opening of the reservoir or positioned therebelow and provided with a deflector for causing part of the lubricant poured into said filler opening first to fill the chassis reservoir. The filler tube so provided with a deflector may extend into the filler opening or project through the top of reservoir to serve itself as the filler opening therefor, suitable openings being provided in the sides of the tube to permit overflow from the reservoir. When the reservoir is integral with engine structure or bolted thereto, a port in the upper part of the reservoir may serve for overflow into the crank case.

In the accompanying drawings in which there are shown one or more of the various possible embodiments of the features of this invention:

Figs. 1, 2 and 3 illustrate one embodiment of the invention utilizing an automatically actuated fluid pressure device for pumping lubricant into the distributing system, Fig. 1 being a side sectional view, Fig. 2 being a top view and Fig. 3 illustrating the attachment of the device to the crank case of an automobile.

Fig. 4 is a longitudinal sectional view illustrating one type of a flow metering device which may be utilized to proportion the lubricant among the chassis bearings of an automotive vehicle;

Figure 17:
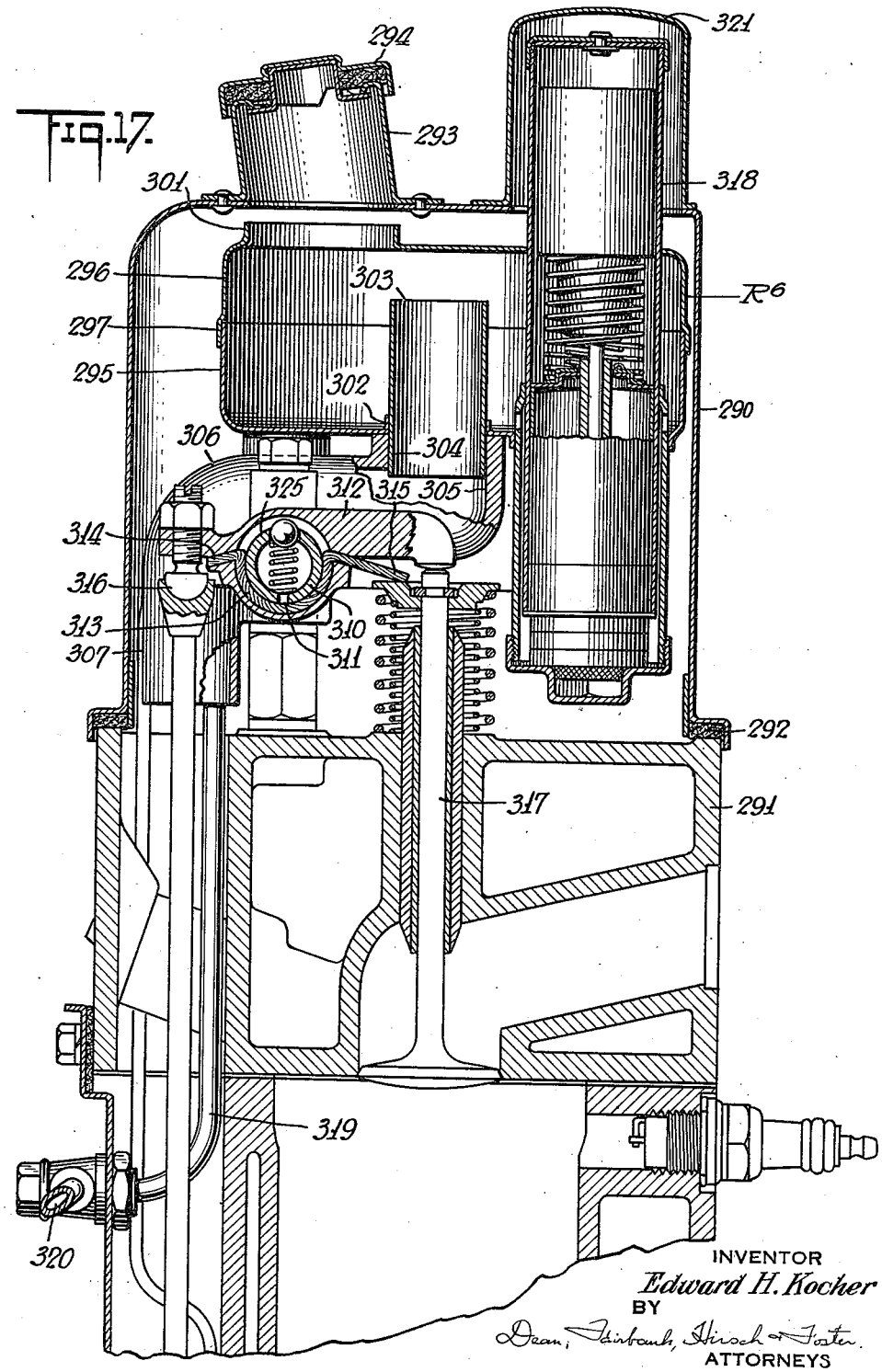

Figs. 5 and 6, Figs. 7 and 8 and Figs. 9 and 10 illustrate, respectively, three modifications, Figs. 5, 7 and 9 being side sectional views of said modifications and Figs. 6, 8 and 10 being, respectively, other views of portions of the filler tubes thereof to show more clearly the deflecting elements associated therewith;

Figs. 11 to 14 show another embodiment, Fig. 11 being a side sectional view and Figs. 12 and 13 being top and side sectional views upon the lines 12—12 and 13—13 of Fig. 11, respectively, and Fig. 14 being a fragmentary side sectional view upon the line 14—14 of Fig. 11;

Figs. 15 and 16 represent another embodiment, Fig. 15 being a side sectional view and Fig. 16 being a top view in fragmentary section on line 16—16 of Fig. 15; and Figs. 17 to 19 represent still another embodiment, Fig. 17 being a side sectional view, Fig. 18 being a side view with a portion of the enclosing structure removed and Fig. 19 being a fragmentary side sectional view upon the line 19—19 of Fig. 18.

In Figs. 1, 2 and 3, the reservoir R is composed of a base cup-shaped member 10 and a cap cup-shaped member 11, the former supporting a pumping mechanism P and a crank case filler pipe C and the latter supporting a fluid pressure motor M. The upper shell 11 is provided with an inlet neck 12 which is adapted to be capped, as indicated at 13, between crank case filling operations and with an opening 14 covered by the dome-shaped member 15 which is attached to the top of the shell 11 by suitable screws (not shown), the gasket 16 being clamped between said dome and the top of said cover to form a lubricant-tight connection.

The reservoir is adapted to be mounted upon the crank case 70 (see Fig. 3) of the motor vehicle by means of a crank case filler 71 extending nearly the full height of the reservoir R and protruding below the bottom thereof for insertion into the crank case filler opening 72 to which it may be clamped by means of the bolt or screw 73 with extension or shank 473 extending entirely thereacross locked against backing out by the nut 74. Tube 71 may be preassembled as a part of the reservoir by soldering or welding it to the neck 75 on the bottom of the shell 10 and to the strap 76, the ends 77 of which lie against and are spot welded to the inner face of the reservoir shell 10.

The motor unit M, illustratively shown as the fluid pressure type, consists of a capsule 9, formed of upper and lower sheet metal members 17 and 18, the edges of which are folded together, as indicated at 19, to clamp the edge 20 of a diaphragm 21 between the gaskets 22. The lower portion of the lower member 18 is formed with a depending cylindrical portion 23 provided with the tits 24 adapted to cooperate with corresponding openings 25 in the side of the dome 15 to hold the capsule in position. The top of the capsule is provided with a connection 26 riveted thereto at 27 and having a tapped socket 28 enabling attachment of a suitable conduit leading from a source of varying fluid pressure, such as the intake manifold or the vacuum tank. The diaphragm is stiffened at its central area by clamping the same between the upwardly and downwardly facing cup-shaped members 32 and 33 by riveting over the upper reduced portion 30 of the hollowed end 34 of the connecting rod 31. The cup 32 also serves as a stop for upward movement of the diaphragm and is provided with a notch 35 enabling ready passage of gas or fluid from the connection 26 into the chamber above the diaphragm even when said cap is pressed against the top of the capsule. The lower cup 33 is adapted to contact with the top of the dome member 15 and serves as a lower stop. The upper part of the dome is provided with openings 36 which vent the chamber below the diaphragm into the reservoir R. The connecting rod 31 is encircled by the spring 37 reacting at its upper end against the dome 15 and at its lower end against a washer 38, held in position upon the connecting rod by the ring 39. The lower end of the connecting rod 31 is hollowed and provided with a conical depression 40 which cooperates with the conical depression in the ring 41 to form a socket for the ball 42 at the top of the plunger 43. The pump body 44 is provided with a central bore 45 at its upper end to receive the plunger 43, said bore communicating by the smaller bore 50 with another aligned bore 46 formed with a valve seat 60 to coact with the spring-seated outlet valve 47, the hollow pressed-in plug 48 serving as a spring retainer. The end of the bore 46 is tapped at 49 to receive a suitable outlet connection to the distribution system 67. The sides of the body 44 are provided with radial inlet bores 51. Encircling the body 44 at the inlet bores 51 is a filter assembly consisting of the ring 53 with its cooperating inlet bores 52, which ring carries the annular cup-shaped metallic mesh strainer 83 and the upwardly dished cover plate 54 therefor, the inner edges of said strainer and plate being attached to said ring and the outer edges being folded together at 55. The filter assembly is clamped against the shoulder 61 of the body 44 by the riveting 56. A flanged ring 58 is attached to the pump body 44 below the bottom 57 and affords a base for a soldered connection 59 between the tank bottom and said pump body.

The motor M may be connected to a suitable source of varying fluid pressure, for example the vacuum fuel-feed tank which is alternately exposed to the suction of the intake manifold and to atmospheric pressure. The diaphragm is elevated by suction stressing the spring 37, which is released when suction ceases, whereupon the stressed spring 37 urges the diaphragm and its connected plunger downwardly. The upward movement of the diaphragm will result in an elevation of the plunger 43 above its inlet port 51 permitting the lower part of the bore 45 to fill with lubricant, and downward movement of the diaphragm will result in the plunger closing the port 51 and then discharging the lubricant in the cylinder 45 past the spring-seated check valve 47 into the distribution system.

Associated with the outlets of the distribution system may be flow metering devices of the type illustrated in Fig. 4. In Fig. 4 the body 85 is threaded at its outlet end 86 for attachment to a socket 87 in a mounting or bearing structure 88, and is provided with a central bore 89 almost completely filled with a pin 90 which forms a narrow annular restriction passage therewith, the length and diametral clearance of which passage determines the rating of the metering device. The outlet socket 91 is formed with a valve seat 92 and is illustratively shown as containing a loose flap valve 93, which may also be spring-seated if desired, while the inlet socket 94 contains a felt strainer 95 backed by a screen mesh 96. The inlet end of the body 85 is threaded at 97 to receive a thimble 98 which cooperates with the compression coupling sleeve 99 and a bushing 100 to clamp the pipe end 101 of the conduit system in liquid-tight connection with the drip plug shown.

In operation the reservoir R is filled through the neck 12 with removal of the cap 13 and since the tube 71 is out of alignment with said filler opening 12, the reservoir will fill to the level of the upper end of the tube 71 whereupon the excess lubricant will overflow to the crank case 70. The arrangement is designed to accommodate a full charge for the crank case, even though the volume thereof be many times the volume of the reservoir R, the area of the filler opening 12 and the tube 71 being so regulated that the filler tube will conduct excess lubricant away from the reservoir R as rapidly as it can be added thereto by means of the filler neck 12. The volume of the chassis reservoir R below the upper edge of the tube 71 should be so regulated that it will segregate or trap an amount of lubricant which will suffice to supply the pump P and in turn the chassis lubricating system for the entire period elapsing between successive crank case filling operations.

In Figs. 5, 7 and 9, are shown three modifications in which similarly functioning parts are designated by the same numeral with the suffix 1, 2 or 3, respectively.

In the embodiment of Fig. 5 the sloping crank case filler tube 71' extends entirely through the reservoir R' and is soldered and brazed or soldered to the necks 75' formed in the top and bottom shells 11' and 10' of said reservoir. The enclosed portion of the tube 71' adjacent the top of the reservoir R is cut away to provide openings 110 and extending completely across this part of the tube is the baffle plate 111 provided with the lugs 112 for attachment to the sides of the tube 71' above and below the openings 110, as by spot welding. In this embodiment the top of tube 71' itself receives the cap 13' and serves as the filler opening for the chassis reservoir. The lubricant poured into the tube 71' will for the most part be deflected by means of the plate 111 into the reservoir R' until it fills the same to the level of the lower edges of the openings 110 whereupon the excess needed to supply the crank case requirements will flow down into the crank case.

In the embodiment of Fig. 7 the sloping filler crank case tube 71² projects upwardly to above the top of the reservoir R² and is fixed within a sleeve 113, the lower portion of which is flared outwardly at 114 and flanged at 115 to close an opening 116 in the top of the reservoir R², the top of the sleeve 113 serving to receive the cap 13². The sides of the tube adjacent the top of the reservoir R² are cut away to provide the openings 117 and a tab is left and turned inward to form a baffle 118, which deflects a part of the lubricant poured into the sleeve 113 into the reservoir R², the remaining lubricant or the excess lubricant above the level of the lower edge of the openings 117 overflowing into the filler tube 71² and into the crank case.

In Fig. 9 the sloping crank case filler tube 71³ is supported by a bracket 119 spot welded or soldered at 120 to reservoir R³. To the top of the tube, by means of the tab 121 is spot welded or soldered the baffle 122 which functions similarly to the baffle 118 of Fig. 7.

It is understood that the embodiments of Figs. 5, 7 and 9 may receive motor and pump mechanisms of the type described in connection with Fig. 1 or as will be subsequently described in connection with other embodiments each delivering through an outlet (not shown) in the tank to the chassis bearings.

In the embodiment of Figs. 11 to 13, the reservoir R⁴ is provided with an elongated horizontal opening 130 in a bulged and flattened portion 131 which is attached, as by welding, to the cover plate 132 provided with a corresponding opening 133, said cover plate being bolted at 134 to cover an opening 135 in the side of the crank case 136. The lower shell 10⁴ is also supported from the crank case 136 by the S-shaped bracket 137 bolted at 138 thereto. The crank case lubricant poured in through the filler neck 12⁴ upon removal of the cap 13⁴ will fill the reservoir R⁴ to the level of the opening 130, whereupon the crank case supply will overflow into the crank case 136.

In this embodiment an inertia-operated pump is illustratively shown associated with the reservoir instead of the fluid pressure-operated pump of Fig. 1. This inertia-operated pump may be of the character described in the prior application Serial No. 398,839, filed October 11, 1929 by Joseph Bijur and will now be briefly described.

The pump and motor casing includes an elongated cylinder 150 extending completely through the reservoir, with its upper end projecting a considerable distance thereabove and its lower end extending some distance therebelow into the sleeve 151, which is soldered to a pendant flange 149. Cylinder 150 is soldered at 152 into an upper opening 153 in the reservoir and is force fitted or soldered into the inwardly turned upper end 154 of the sleeve 151. Except for this inwardly turned top portion, the sleeve 151 is slightly larger in internal diameter than the external diameter of the cylinder 150 thereby leaving an annular space 155 between the cylinder and sleeve into which oil may flow from the reservoir through the openings 156 adjacent the top edge of the sleeve 151. The cylinder 150 is closed at its top by a flanged cap 157 and at its bottom by a block 158 force fitted thereinto, this block including a flange 159 to abut the lower end of the cylinder. The pump body 160 includes a tapered intermediate portion 161 force fitted into a tapered receiving bore in the block 158.

Upper and lower partition disks 163 and 164 of identical construction extend transversely of the cylinder 150 and with the cap 157 and the block 158 subdivide the cylinder into three chambers. The uppermost chamber 165 houses the motor, the lowermost chamber 166 may be termed the pump chamber and the central chamber 167 between the partition disks serves as a reservoir. The disks 163 and 164 have their edges confined between partial shears 168 in the cylinder walls and inwardly struck projections 149 in such walls. At their centers they are apertured and flanged at 169 to provide substantial bearings for the sliding movement of a connecting rod 170 which transmits power from the motor to the pump.

In the motor mechanism, the upper end of connecting rod 170 extends through a bore 171 in a relatively massive inertia weight 172 and is fixed thereto by the threaded bushing 174 and the compression sleeve 177 cooperating with the tapped socket, the weight being sustained in free floating position by coiled supporting spring 173 reacting against the disk 163 and deriving energy from the vibration incidental to normal running of the car.

Disks 163 and 164 are formed with central circular upstruck portions or offsets 178 and 179 having openings 180 and 181 therein, the offset 178 of the upper disk serving to center the spring 173. Weight 172 throughout its upper portion is cylindrical and of less diameter than the cylinder 150 and near its lower end is undercut to provide a downwardly facing shoulder or seat 182 resting on the spring 173. Below this shoulder, the weight is of inverted frusto-conical shape, lying within spring 173, its flat lower face adapted to be stopped in its downward movement by a short coiled buffer spring 183 affording a lower stop. A disk or strap 184 overlying the upper face of the disk 163 and conforming to its contour is formed with one or more outstruck fingers 185 to grip the lowermost convolution of buffer spring 183 and hold the latter against displacement.

Referring now to the pump (see particularly Figs. 11 and 14), body 160 is formed with a longitudinal bore 186 extending therethrough and with an unpacked self-porting plunger 187 sliding therein. The lower portion of this bore opens out into a valve chamber 188 in which the spring seated outlet valve 189 is accommodated. Therebelow, bore 186 is further enlarged to accommodate a sealing plug 190, screwed home to plug the lower end of the bore. A transverse bore 193 intersecting bore 186 provides a pair of inlet ports for the pump, that portion of the bore 186 between the bore 193 and valve 189 defining the pump cylinder proper and that portion of the bore 189 above the bore 193 serving merely as a guide for the plunger 187.

As best seen in Fig. 14 the chamber 188 is provided with diametrically opposite ports 202, communicating with an annular groove 203 in the exterior of body 160, which in turn communicates with radial passageways 204 in the block 158, opening into sockets 405 to which the outlet pipe lines are connected.

The filter consists of a series of felt filter rings 208 slipped over a cylinder of wire mesh, the lower end of which is soldered into a depression 207 in the bottom of the flange cap 205. The top of the mesh cylinder 206 is spun over at 209 upon a washer 210 lying upon the inner edge of the uppermost felt ring 208. The filter assembly is attached to the bottom of the tube 151 by screwing the flange cap 205 thereupon, the outer edge of the filter being forced against the lower edge of the block 158 during said operation.

In operation the oil in the reservoir flows downwardly through openings 156 into passageway 155 and into the bottom of sleeve 151. It seeps through the filter and rises through recess 211 and passage 213 in block 158 into the chamber 167, immersing the pump and rising through opening 181 into chamber 166 where it lubricates the connecting rod 170 until it reaches the level of lubricant in reservoir. The valve 189 prevents flow of oil out of the pump cylinder which is normally kept full by gravity flow through ports 193. When the motor car is started, the normal vibration incidental to its running will impart a jiggling movement or reciprocation to the floating weight 172 and the connecting rod 170 to which it is fixed, this motion being transmitted through the connecting rod 170 to the plunger 187 which is alternately retracted to permit oil to flow through ports 193 into the cylinder and rammed home to force all or part of the pump charge past the valve 189, resulting in a substantially continuous feed into the distributing system.

In the embodiment of the Figs. 15 and 16, the reservoir $R^5$ is formed in the support arm 250 or other structure unitary or rigid with the crank case 251, said arm being open at the top and provided with a cover 252 having a filling opening 253 closed by the sliding cap 254 pivotally connected by the strap 255 and the screw 256 to the cover 252, said cap 254 being provided with a handle 257 enabling manipulation thereof. The reservoir $R^5$ is also provided with the overflow opening 258 permitting excess lubricant for crank case replenishment to flow into the crank case, said opening being protected by the outwardly flaring apron 259 bolted at 260 to the supporting structure to prevent dirty lubricant dripping down from the valve rocker arm bearings 261 into said reservoir $R^5$. The motor and pump mechanism 262 is of substantially the same construction as in the case of the embodiment of Fig. 11, except that the bottom of the unit is not enclosed by a sleeve but directly communicates with the reservoir $R^5$ by means of the inlet openings 263, a single outlet 264 from the pump being provided, which outlet communicates with a pipe 265 extending along the side of the structure into the opening 266 in the protuberance 270 of the supporting ledge 267 at the top of the structure 262, said ledge being flanged at 268 and bolted to the cover 252 at 269. The protuberance 270 is also provided with the outwardly extending horizontal bores 271 communicating with the vertical bore 266. The outer ends of the bores 271 are enlarged and tapped at 272 for connection to the pipe ends 273 leading to the distribution system.

In the embodiments of the Figs. 17 to 19, the reservoir $R^6$ is enclosed within a cover 290 resting upon and associated in lubricant-tight relation with the engine structure 291 by means of the gasket 292, said cover being provided with a filler neck 293 closed by a removable cap 294. The reservoir $R^6$ is composed of an upper shell 296 and a lower shell 295 telescoped together and soldered or welded at 297, said shells being somewhat flattened and widened as compared to the shells of the embodiments of Figs. 1, 5, 7 and 11, the bottom shell resting upon and being supported by the brackets 298 spot welded or soldered at 299 thereto and bolted at their other ends 300 to the engine structure. The upper shell 296 is provided with a filler neck 301 registering with the filler opening 293 on top of the cover 290. Fixed in neck 302 in the bottom shell 295 is a crank case filler tube 303, the lower portion 304 of which fits in a liquid-tight manner within an opening 305 in the hollow elbow casting 306 (see also Fig. 19). The downwardly projecting portion 307 of the casting 306 pours oil down into the engine sump. The casting 306 is also intermediately provided with a bored protuberance 308 into which is fitted the pipe 309, the upper portion of which communicates with the interior of the casting 306 by the opening 310. The pipe 309 extends the length of the top of the engine, see particularly Fig. 18,) and has a series of openings 311 where it passes through the valve rocker arms 312 establishing communication between the pipe and the annular groove 325 within the rocker arm, which groove encloses the wick 313. The wick 313 is provided with extensions 314 and 315 overhanging, respectively, the ball bearing 316 at the top of the valve push rod and the sleeve bearing 317 of the valve itself. Attached to the reservoir $R^6$ and projecting entirely therethrough is a pump and motor combination 318 substantially of the same construction as of the embodiment of Fig. 11, said pump supplying conduits 319 and 320 leading to the chassis distributing system. The top of the unit 318 projects above the cover 290 and is enclosed in the dome 321.

In operation the necessary lubricant for replenishing the chassis reservoir $R^6$ as well as the crank case is poured in to the filler opening 293, after the cap 294 is removed. The lubricant will first fill the reservoir R⁶ to the level of the tube 303, whereupon the excess for crank case requirements will flow through the tube 306 and down through the case along the side of the engine. A portion of the lubricant passing through the tube 306 will flow into the tube 309 by means of the opening 310 and will supply the wicks 313 by means of the openings 311. The overhanging ends 314 and 315 of the wicks 311 will assure lubrication of the bearings at the ends of the valve rocker arm.

It is obvious that many other forms of mechanisms for forcing lubricant in the chassis distributing lines might be utilized instead of the specific fluid pressure or inertia-operated embodiments illustratively shown. Also other means as float-operated outlet valves could be employed to assure that the lubricant for replenishing the crank case supply might flow thereto either before, during or after the replenishment of the chassis reservoir. Although, if desired, the chassis reservoir could be provided with suitable means to enable breathing of the crank case therethrough, it is usually desirable to provide a separate crank case breathing arrangement which may be readily placed adjacent the crank case filling arrangement of the present invention.

As many changes could be made in the above construction, and many apparently widely different embodiments of this invention could be devised without departing from the scope thereof, it is intended that all matter contained in the above description or shown in the accompanying drawings shall be interpreted as illustrative and not in a limiting sense.

I claim:—

1. A lubricating installation for an automobile comprising a chassis lubricating system, a reservoir for supplying lubricant to the chassis lubricating system, an engine oil reservoir, and a lateral passageway connecting the upper part of the chassis reservoir with the engine reservoir and permitting overflow of lubricant from the chassis reservoir to the engine oil reservoir, said chassis reservoir being attached to the side of said engine structure, said lateral passageway extending directly out of the chassis reservoir into the engine reservoir without being in heat exchange contact with the body of lubricant in the lower part of said chassis reservoir.

2. A lubricating installation for an automobile comprising a chassis lubricating system, an engine lubricating system, a reservoir for supplying lubricant to the chassis lubricating system, a reservoir for supplying lubricant to the engine lubricating system, said reservoirs being positioned alongside of one another, and a passageway connecting the upper part of the chassis reservoir with the engine reservoir and permitting overflow of lubricant from chassis reservoir to the engine reservoir, said passageway being formed by a cooperating horizontally elongated opening in the upper side wall of the chassis reservoir and the engine structure and being protected by a depending cover to prevent the engine lubricant from dripping or splashing into the chassis reservoir, said passageway being continuously open so as to afford constant communication between said reservoirs.

3. An automobile lubricating installation comprising a chassis lubricating system, a chassis reservoir, an engine oil reservoir, said second reservoir to supply the engine lubricating system, the chassis reservoir being located slightly above said engine reservoir and a lateral passageway connecting the two reservoirs passing through the side wall of the chassis reservoir and through the top of the engine reservoir, said lateral passageway extending directly out of the chassis reservoir into the engine reservoir without being in heat exchange contact with the body of lubricant in the lower part of said chassis reservoir.

4. A lubricating installation for an automobile comprising a chassis lubricating system, a reservoir for supplying lubricant to the chassis lubricating system, an engine oil reservoir, and a lateral passageway from the chassis reservoir to engine reservoir to convey to the latter lubricant in excess of chassis requirements, said conduit passing through an opening in the side of the chassis reservoir and the top of the engine reservoir, said chassis reservoir being affixed to said engine reservoir, said lateral passageway extending directly out of the chassis reservoir into the engine reservoir without being in heat exchange contact with the body of lubricant in the lower part of said chassis reservoir.

5. A lubricating installation for an automobile comprising a chassis lubricating system, an engine oil reservoir, a chassis reservoir and a passageway connecting the upper part of the chassis reservoir with the engine reservoir and permitting overflow of lubricant from the chassis reservoir to the engine reservoir, said chassis reservoir being formed in an integral part of said engine structure, said integral part of the engine structure taking the form of a supporting leg which is open at its side to the crank case and also at its top, said open leg structure being provided with a liquid-tight cover carrying a filler opening and a pump and motor combination, the latter depending downwardly into the reservoir and having an outlet adjacent the top thereof above said cover.

6. A lubricating installation for an automobile comprising a chassis lubricating system, a reservoir for supplying lubricant to the chassis lubricating system, a reservoir for supplying lubricant to the engine lubricating system, and a passageway connecting the upper part of the chassis reservoir with the engine reservoir and permitting overflow of lubricant from the chassis reservoir to the engine reservoir, said chassis reservoir being formed in an integral part of said engine structure, said integral part of the engine structure being open at its side to the crank case and also being open at its top, said top opening being provided with a liquid-tight cover carrying a pump and motor combination, the latter depending downwardly into the reservoir and having an outlet adjacent the top thereof above said cover.

7. A lubricating installation for an automobile chassis and engine comprising a chassis lubricating system, an engine lubricating system, a reservoir for supplying lubricant to the chassis lubricating system, a reservoir for supplying lubricant to the engine lubricating system, said reservoirs having a side wall in common and an opening from and through the upper side wall of the chassis reservoir to engine reservoir, said opening passing through said common wall to convey to the latter lubricant in excess of chassis requirements, said conduit being provided with baffle means to prevent return passage of dirty lubricant by splashing from the engine reservoir to the chassis reservoir, said opening from the chassis reservoir to the engine reservoir being continuously open so as to establish constant communication between said reservoirs and between the air bodies held in said reservoirs.

8. A lubricating installation for an automobile comprising a chassis lubricating system, an engine lubricating system, a reservoir for supplying lubricant to the chassis lubricating system, a reservoir for supplying lubricant to the engine lubricating system, said reservoirs having a side wall in common, and an opening from the chassis reservoir to engine reservoir, said opening passing through said common wall to convey to the engine reservoir lubricant in excess of chassis requirements, said opening being in the top of the side of the chassis reservoir and in the top of the engine reservoir and being provided with deflecting means, to prevent return passage of dirty lubricant by splashing from the engine reservoir to the chassis reservoir, said opening from the chassis reservoir to the engine reservoir being continuously open so as to establish constant communication between said reservoirs and between the air bodies in contact with and above the lubricant bodies held in said reservoirs.

EDWARD H. KOCHER.